April 8, 1958  R. R. SILLIFANT ET AL  2,830,170
WELDING JIG
Filed Aug. 13, 1956
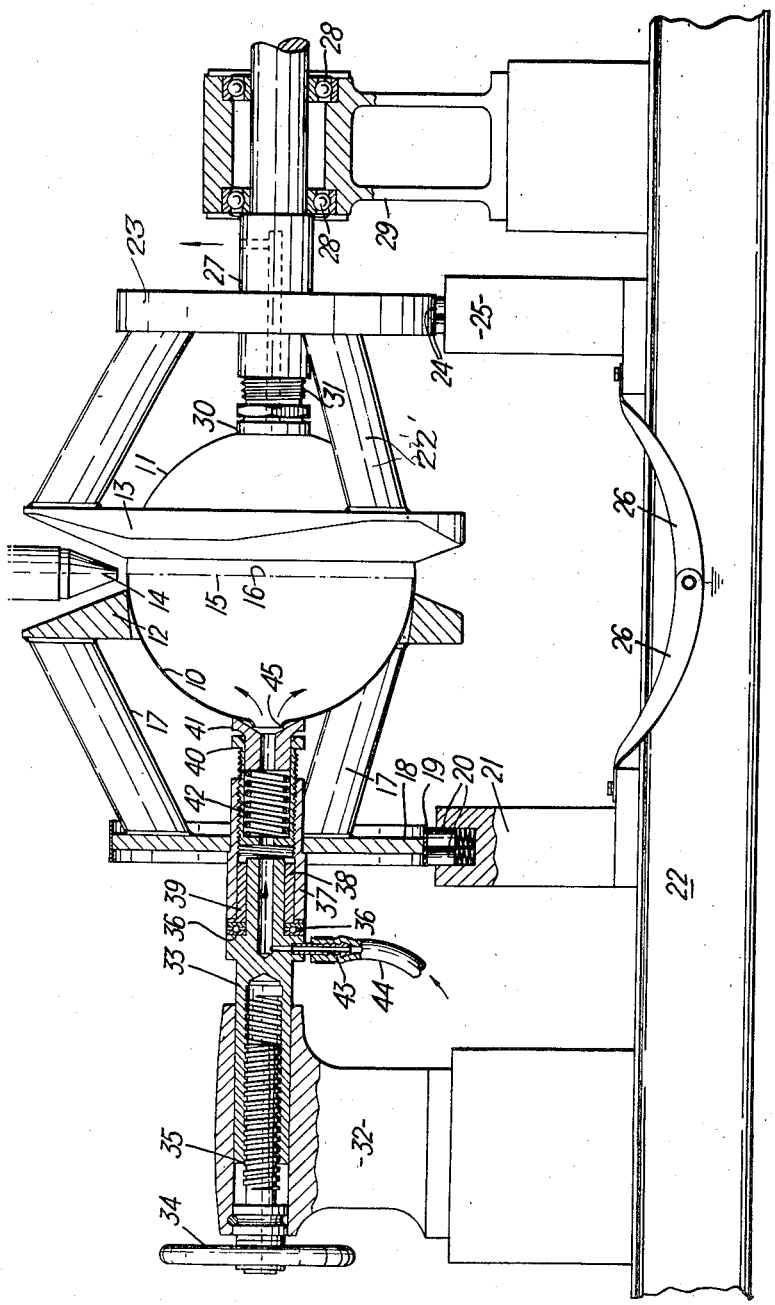
Inventor
RICHARD REGINALD SILLIFANT
HENRY RICHARD DEAN
By Lee L. Townshend
Attorney United States Patent Office 2,830,170
Patented Apr. 8, 1958

2,830,170

WELDING JIG

Richard Reginald Sillifant and Henry Richard Dean, London, England, assignors to The British Oxygen Company Limited, a British company Application August 13, 1956, Serial No. 603,608

4 Claims. (Cl. 219—159)

The present invention relates to welding jigs for holding work during the performance of welding operations.

According to the present invention, a welding jig for holding work during welding along a circular path comprises two clamps of circular form shaped to make intimate contact with the work in proximity to the circular path over areas substantially symmetrically disposed about the circular path. In consequence of the symmetrical disposition of the portions of the clamps making contact with the work, there are provided substantially symmetrical paths for the conduction of heat from the work during welding. Such conduction of heat may be arranged to prevent excessive heating of other portions of the work which might cause the distortion or the setting-up of internal stresses in the work.

A welding jig in accordance with the present invention is especially suitable for electric arc welding, though it can also be used with advantage with other methods of welding, such for instance, as gas welding. When used for electric arc welding, the symmetrical disposition of the areas of contact between the clamps and the work can be arranged to provide substantially symmetrical electrical paths for the conduction of the welding current.

According to a feature of this invention, provision is made for supplying a purging gas to the work during welding. For example, if the work is a vessel, a supply of purging gas at a pressure slightly above atmospheric pressure can be supplied to the interior of the vessel. The supply of purging gas may be effected through any convenient orifice in the vessel, such for instance, as an orifice lying generally on the axis of the circular path along which welding is to be effected.

In order to facilitate the performance of the welding operation, the clamps may be supported for rotation about an axis extending along the axis of the circular path, so that the work can be rotated about this axis to present the circular welding path to a stationary welding torch or welding head. The rotation can be effected by a power drive, and advantageously provision may be made for varying the speed of rotation to suit the welding operation.

One form of construction in accordance with the present invention intended for uniting two hemispherical shells to form a sphere by means of electric arc welding will now be described by way of example with reference to the accompanying drawing, which shows the apparatus and shells in elevation and partly in section.

Referring to the drawing; two hemispherical metal shells 10 and 11 are engaged by annular clamping rings 12 and 13 respectively. The clamping rings 12 and 13 are made of copper or copper alloy or other material having high electrical and thermal conductivity and are of large cross section so that they provide a sink for heat and prevent dimensional distortion during or after welding. Between the clamping rings 12 and 13 there is allowed sufficient space for the entry of the nozzle 14 of a welding torch which can conveniently be of the type using a tungsten electrode which is surrounded by a stream of argon or other shielding gas which protects the electrode and the welding zone during the welding operation. Subject to the necessity for providing access for the welding torch, the separation between the clamping rings 12 and 13 and the butting edges 15 and 16 of the shells 10 and 11 to be welded is kept as small as possible, so that immediately after welding the heat can be dissipated into the clamping rings.

The clamping ring 12 is supported by three arms 17 supported by a disc 18, so that they form a spider. Around the periphery of the disc 18 there is provided a slipring 19, which makes contact with spring-loaded carbon brushes 20 which are guided for movement in a pillar 21 supported from a bedplate 22. The other clamping ring 13 is similarly supported by arms 22' and a disc surrounded by a slipring 23, which makes electrical contact with carbon brushes 24 mounted on a pillar 25, which is bonded to the pillar 21 by straps 26. Electric current is fed to the junction of the straps 26 during welding.

The disc surrounded by the slipring 23 is supported by a shaft 27 mounted in journal bearings 28 on a pedestal 29. The shaft 27 is driven at its right-hand end through a reduction gear from an electric motor at a suitable speed for the performance of the welding operation around the butted edges 15 and 16 of the two hemispherical shells. Interposed between the inner end of the shaft 27 and the centre of the hemispherical shell 11 is a pad 30 supported by a screw-threaded sleeve 31 which engages an internal screw thread in the inner end of the shaft 27. By turning the sleeve 31, the pad 30 can be urged into engagement with the hemispherical shell 11 so as to exert axial pressure on the shell. The disc 18 is supported by a tailstock 32 having a spindle 33 which can be moved axially by a handwheel 34 which actuates a screw-threaded rod 35 which engages an internal screw thread in the spindle 33. The spindle 33 is provided with a shoulder for a thrust bearing 36. The disc 18 is welded to a sleeve 37 carrying a bearing metal insert 38 which is rotatable about a spigot 39 formed at the inner end of the shaft 33. At its end nearest to the hemispherical shells 10 and 11, the sleeve 37 is provided with an internal screw thread engaged by a screw-threaded sleeve 40 which provides means for adjusting the axial pressure on a pad 41 which is arranged to bear on the hemispherical shell 10. The pad 41 is pressed into engagement with the hemispherical shell 10 by means of a coil spring 42. The pad 41 and spigot 39 are hollow so as to provide a through passage from a nipple 43 for a gas supply pipe 44 to an aperture 45 on the axis of rotation of the hemispherical shells 10 and 11. The gas connection is used for supplying a purging gas which can conveniently be the same as that used for shielding the welding electrode, namely argon.

In operation, after the hemispherical shells 10 and 11 have been assembled edge to edge and secured by the clamping rings 12 and 13 by means of the tailstock, the screwed sleeves 31 and 40 are adjusted so as to exert a predetermined compressive axial thrust tending to squeeze the shells along the axis of rotation. The magnitude of this compressive thrust is selected to compensate for any stresses or distortion which may occur as a result of the welding operation. The axial thrust can, for example, be adjusted so that the finished welded hemispheres form a truly spherical assembly.

The clamping rings in the construction above described make intimate contact with the work in proximity to the welding path and also provide, in close proximity to the weld, a considerable body of metal which prevents excessive heating of parts of the work more remote from the welding path. The clamping rings also provide symmetrical paths for the conduction of current from the welding arc.

While this invention has been described as applied to an arrangement for welding hemispherical shells to form a spherical assembly, it will be appreciated that it is also applicable to other arrangements for welding an assembly which can be turned about an axis of rotation.

We claim:

1. A welding jig for holding work during electric welding along a circular path comprising two clamps of circular form shaped to make intimate contact with the work in proximity to the circular path over areas substantially symmetrically disposed about the circular path, the clamps being adapted to provide a sink for heat from the proximity of the circular path, and also to conduct welding current to the work, a connection for one terminal of a welding current supply, and means for conducting welding current between the two clamps and said connection.

2. A welding jig as claimed in claim 1, wherein means are provided for mounting the two clamps for rotation about an axis perpendicular to the circular welding path.

3. A welding jig as claimed in claim 1, having provision for supplying purging gas to the work during the welding operation.

4. A welding jig for holding work during electric welding along a circular path comprising two clamps of circular form shaped to make intimate contact with the work in proximity to the circular path over areas substantially symmetrically disposed about the circular path, the clamps being adapted to provide a sink for heat from the proximity of the circular path, and also to conduct welding current to the work, a connection for one terminal of a welding current supply, means for conducting welding current along substantially symmetrical paths between the two clamps and said connection, means for mounting said clamps for rotation about an axis perpendicular to the circular welding path, means for supplying a purging gas to the work, and means for exerting a pressure along the axis of rotation on the work to be welded.

References Cited in the file of this patent

UNITED STATES PATENTS

| | | |
|---|---|---|
| 537,013 | Burton et al. | Apr. 9, 1895 |
| 1,509,507 | Gruenfeldt | Sept. 23, 1924 |
| 1,839,437 | Priebe | Jan. 5, 1932 |
| 2,091,308 | Catlett | Aug. 31, 1937 |
| 2,733,327 | Frojd | Jan. 31, 1956 |